Patented Oct. 10, 1950

2,525,676

UNITED STATES PATENT OFFICE 2,525,676

HEAT SEALABLE REGENERATED CELLULOSE FILM AND METHODS OF MAKING SAME

William A. Hoffman, Wilmington, Del., assignor to E. I. du Pont de Nemours & Company, Wilmington, Del., a corporation of Delaware No Drawing. Application March 27, 1945,
Serial No. 585,191

10 Claims. (Cl. 117—73)

This invention relates to the production of a heat sealable, transparent sheet or film, and more particularly to the production of a moistureproof, heat sealable, transparent sheet or film of regenerated cellulose suited for use as a wrapping tissue.

An object of this invention is to render thin, transparent films or sheets of regenerated cellulose heat sealable.

Another object of this invention is to produce a moistureproof, transparent film or sheet of regenerated cellulose which film or sheet may be sealed to itself or to a like film or sheet merely by the application of heat and pressure at the point or points to be sealed whereby to form an exceptionally strong and lasting seal.

Another object is to produce a coated transparent film or sheet of regenerated cellulose coated with a moistureproofing heat sealable composition, which film or sheet is characterized by an extremely high heat seal strength.

Still another object is to produce a transparent film or sheet of regenerated cellulose to which is strongly anchored a moistureproofing, heat sealable transparent coating, which film or sheet is characterized by an exceptionally high heat seal strength.

A still further object is to introduce into a gel regenerated cellulose film or sheet on the casting machine, materials which will render the dried film or sheet heat sealable.

Another object is to treat wet gel regenerated cellulose structures in a simple, direct, economical fashion whereby to render the dried film heat sealable and moisture resistant, without adverse effect on clarity or transparency.

Another object is to treat a wet gel regenerated cellulose sheet or film to the end that when the sheet or film is coated with a moistureproofing, heat sealing composition, the resulting coated film or sheet will have a heat seal strength substantially higher than the heat seal strength of an untreated regenerated cellulose sheet or film coated with the same moistureproofing, heat sealing, coating composition.

The above and other objects will more clearly appear in and from the following description.

These objects are accomplished by my invention which, stated in brief, comprises combining with regenerated cellulose sheet or film, as by impregnation from aqueous solution, (1) a small amount of a water-soluble polyvinyl alcohol containing groups from the class consisting of ester, ether, acetal and ketal groups which render the polyvinyl alcohol compatible with conventional moistureproofing coating compositions for regenerated cellulose, and, desirably, (2) a small amount of a water-soluble, thermosetting resin or like hardening agent for polyvinyl alcohol, and thereafter drying the treated sheet or film in the usual fashion. The resulting dried film may be used to advantage for many purposes without further treatment or the treated film may be coated with a moistureproofing, and/or heat sealing composition in the manner known to the art. Moistureproofness may also be imparted to the regenerated cellulose sheet or film by suitably treating the sheet or film with an aqueous composition comprising, in addition to the water-soluble polyvinyl alcohol and thermosetting resin ingredients of this invention, a moistureproofing agent, e. g. paraffin wax, as will be more fully described hereinafter.

In its preferred and simplest form this invention contemplates incorporating the modifying ingredients of the invention in the regenerated cellulose while the latter is still in the casting machine and in the wet gel condition. This is accomplished by dissolving proper amounts of the water-soluble polyvinyl alcohol and the water-soluble thermosetting resin directly in the aqueous glycerol or equivalent bath commonly applied to the gel regenerated cellulose film for softening purposes. The film, after the usual purifying steps, passes through this bath and is subsequently dried in the usual manner. If desired, however, the heat seal-promoting material may be incorporated in the film by any convenient expedient either prior or subsequent to the softening of the film, and the hardening agent may be incorporated in the film at any appropriate stage either alone or together with the water-soluble polyvinyl alcohol or softening agent.

The term "polyvinyl alcohol" as used hereafter throughout this specification refers to a polyvinyl product containing a sufficiently large proportion of hydroxyl groups in the molecule to render the polymer soluble in water which may in some instances be heated, the hydroxyl content being in the neighborhood of from 70% to 96% of the theoretical maximum and obtained, for example, by hydrolyzing polyvinyl acetate until all but 30% to 4% of the theoretical acetyl maximum is split off.

Partially saponified polyvinyl acetate containing from 4% to 30% residual polyvinyl acetate is particularly suited for purposes of the instant invention and water-soluble polyvinyl alcohol containing about 20% residual polyvinyl acetate, and having a saponification number of about 150, constitutes a preferred material herein. Polyvinyl alcohol containing no residual or derivative ester, ether, acetal or ketal groups does not improve the regenerated cellulose film in the manner described herein, and if the content of residual or derivative groups is sufficiently high to render the polyvinyl alcohol water-insoluble the compound will not properly bond to the base sheet from an aqueous system. As examples of other derivatives of polyvinyl alcohol useful in accordance with the principles of my invention there may be mentioned water-soluble partial esters of polyvinyl alcohol such as partial propionates, glycollic acid esters, formates, and lactates; the water-soluble partial ethers such as methyl, ethyl, glycol and glycollic acid ethers; the partial acetals such as formal, acetal, glyoxal, propional and butyral, and the water-soluble partial ketals of polyvinyl alcohol obtained by reacting polyvinyl alcohol with a ketone such as acetone, methyl ethyl ketone, diethyl ketone, etc. In addition, suitable water-sensitive derivatives of polyvinyl alcohol may be produced by interpolymerization of polyvinyl ester or polyvinyl alcohol with small proportions of other components such as methacrylic acid, vinyl chloride, ethylene, etc.

Regenerated cellulose film containing as little as 0.05% by weight of the polyvinyl alcohol exhibits marked heat sealing characteristics, and while the improvement in heat seal strength increases as the content of polyvinyl alcohol increases in most instances it will be found that the advantages to be gained by using more than about 2.0% by weight of polyvinyl alcohol do not compensate for the added cost of materials. In general, it is preferred to use the polyvinyl alcohol in amounts within the range of from 0.1% to 1.0% by weight based on the weight of the dry film.

Any water-soluble synthetic resin capable of conversion to the insoluble state under the influence of heat and in the presence of a polymerization catalyst, may be employed as the hardening agent in accordance with the principles of my invention. Because of their ready commercial availability and particular adaptability it is preferred to use the water-soluble urea-formaldehyde resins as the thermosetting resin component herein. Other suitable resins are phenol aldehyde including polyhydric phenol aldehyde, melamine aldehyde and other amine aldehyde resins. Other hardening agents for polyvinyl alcohol, such as chromic acetate, chromic nitrate and boric acid, may also be used with good effect.

As a moistureproofing coating composition to be applied to the treated sheet or film, my invention contemplates any composition comprising a film-former, a moistureproofing agent, and a heat seal-promoting agent carried in a suitable volatile solvent. In addition the composition may include anchoring agents, plasticizers, blending agents, stabilizers, and any other constituent commonly employed in such compositions. Suitable coating compositions and their application are particularly described in U. S. Patents Nos. 1,997,583 (Hitt), 2,079,379 (Mitchell), 2,280,829 (Jebens), and 2,301,959 (Lanning).

A moistureproofed heat sealable sheet or film of regenerated cellulose may also be prepared in a single step and directly in the film casting machine by adding to the usual aqueous softener bath from about 1% to about 10%, and preferably from 2% to 4% by weight of a dispersed, high melting paraffin wax or equivalent moistureproofing agent together with the proper amount of the water-soluble polyvinyl alcohol and, when desired, the proper amount of water-soluble hardening agent such as water-soluble urea-formaldehyde resin, as described hereinabove. The film is passed through this bath after which the excess composition is removed and the film dried in the customary fashion.

The amount of heat required to convert the water-soluble thermosetting resin to the hardened state varies, of course, with the composition of the resin, as will be immediately evident to those skilled in the art. However, in general, the temperatures and time which ordinarily obtain in the drying stage of the film-casting procedure are sufficient for the purpose of setting the hardening agents incorporated in the wet gel film. To prevent conversion of the resin in the softener bath, it is desirable to operate the bath at temperatures below about 65° C.

Heat seal bond, heat seal bond strength, moistureproofness, and moistureproofing agents are defined, and standard tests for their determination are given in U. S. Patent No. 2,147,180 (Ubben). In the interest of brevity the definitions and description of tests are not repeated herein though it is to be understood that the expressions related thereto and employed herein are in accordance with such definitions and descriptions.

My invention in its preferred and specific embodiments will now be described in the following examples wherein parts and percentage compositions are by weight unless otherwise indicated.

*Example I*

Regenerated cellulose film in the gel state, which has been cast from a viscose solution and purified in the usual manner and is ready for the softening treatment, is passed through an aqueous softening bath containing in addition to 11% of glycerol, 1% of a partially saponified polyvinyl acetate containing 20% residual polyvinyl acetate and having a saponification number of about 150. Excess bath is removed by squeeze rolls and the film is then dried in the usual way by bringing the film directly from the squeeze rolls into contact with heated rolls which operate to dry the film at a temperature of from 60°–90° C.

The resulting product is a flexible, soft-surfaced film 0.0009 of an inch thick containing 28.9% glycerol and 1% of the partially saponified polyvinyl acetate, and has a heat seal strength of 319 grams.

*Example II*

A gel regenerated cellulose film prepared as described in Example I is passed through an aqueous bath containing 11% glycerol, 1% of a partially saponified polyvinyl acetate containing 20% residual polyvinyl acetate and having a saponification number of about 150, 0.5% of a partially polymerized dimethylol urea resin (sold under the trade name of Uformite 414), and 0.05% maleic acid. Excess bath is squeezed from the film and the film is dried in the usual way.

The product is a clear, flexible, hard-surfaced film 0.0009 of an inch thick containing 28.2% glycerol, about 1.0% of the partially saponified polyvinyl acetate, and 0.05% of dimethylol urea resin. It has a heat seal bond strength of 343 grams and is admirably suited for use as a wrapping tissue where moistureproofness is not required.

Example III

The film of Example II is coated on both sides with the following composition:

| | Per cent |
|---|---|
| Urea formaldehyde monohydric alcohol (isobutanol) resin solution (65% solution isobutanol) | 4.00 |
| Para-toluene sulfonic acid | 0.50 |
| Nitrocellulose (high viscosity) | 0.50 |
| Isobutyl alcohol | 33.25 |
| Toluene | 28.50 |
| Ethyl acetate | 33.25 | and the coated film is dried to remove the solvents.

The coated film thus obtained is moistureproofed by passing it through a composition consisting of:

| | Per cent |
|---|---|
| Nitrocellulose (11.4% N) | 5.64 |
| Dammar (dewaxed) | 0.83 |
| Dibutyl phthalate | 1.53 |
| Dicyclohexyl phthalate | 3.05 |
| Santolite MHP (an aryl sulfonamide formaldehyde resin sold by Monsanto Chem. Co.) | 0.59 |
| Paraffin wax (M. P. 61° C.) | 0.36 |
| Ethyl acetate | 57.20 |
| Ethyl alcohol | 2.64 |
| Toluene | 28.16 | and drying the coated film to remove the solvent.

The product is a transparent, flexible, moistureproof coated film having a heat seal bond strength in excess of the strength of the film. This film is particularly suited as a wrapping tissue for packing fish, butter, ice cream and like commodities having a high water content.

Example IV

A gel regenerated cellulose film prepared as described in Example I is passed through an aqueous bath containing 11% glycerol and 1% of a water-soluble polyvinyl alcohol in which 13% of the hydroxyl groups have been reacted with butyraldehyde. Excess bath is squeezed from the film and the film dried in the usual way and coated with a moistureproofing heat sealable composition as described in Example III. The product is a transparent flexible moistureproof coated film having a heat seal bond strength of 465 grams compared to 268 grams for untreated film (i. e., containing no polyvinyl alcohol) coated with the same moistureproofing heat sealable composition.

Example V

Purified gel regenerated cellulose film is passed through an aqueous bath containing 10% glycerol and 0.25% of a partially saponified polyvinyl acetate containing 20% polyvinyl acetate and having a saponification number of about 150, and after excess solution is removed the treated film is dried in the usual manner at 60°-90° C.

The resulting film containing 20% glycerol and about 0.25% of the partially saponified polyvinyl acetate is coated on both sides with moistureproofing, heat sealing composition consisting of:

| | Per cent |
|---|---|
| Nitrocellulose (11.4% N) | 5.64 |
| Dammar (dewaxed) | 0.83 |
| Dibutyl phthalate | 1.53 |
| Dicyclohexyl phthalate | 3.05 |
| Santolite MHP (an aryl sulfonamide formaldehyde resin sold by Monsanto Chem. Co.) | 0.59 |
| Paraffin wax (M. P. 61° C.) | 0.36 |
| Ethyl acetate | 57.20 |
| Ethyl alcohol | 2.64 |
| Toluene | 28.16 | and dried to remove the solvents.

The product is a transparent, flexible, moistureproof film having a heat seal bond strength of 425 grams. In contrast, a coated film of identical composition save that no partially saponified polyvinyl acetate was incorporated in the film exhibited a heat seal bond strength of 240 grams.

Example VI

Purified gel regenerated cellulose film from viscose is softened with ethylene glycol from an aqueous bath containing different amounts of a partially saponified polyvinyl acetate containing 20% residual polyvinyl acetate and having a saponification number of about 150, and after drying is coated on both sides with a moistureproofing coating as in Example IV. The products contain from 22-24% ethylene glycol, are moistureproof, flexible, transparent, and have the following heat seal bond strengths:

| Per cent partially saponified polyvinyl acetate in bath | Heat seal bond strength |
|---|---|
| | Grams |
| 0.0 | 185 |
| 0.5 | 320 |
| 1.0 | 400 |

Example VII

Purified gel regenerated cellulose film is passed through an aqueous bath containing 10% glycerol, 3% of Aridex WP (a mixture containing predominantly a high melting paraffin wax), 1% of a partially saponified polyvinyl acetate containing 20% residual polyvinyl acetate and having a saponification number of about 150, 2% Uformite-414, and 0.2% maleic acid, and dried at a temperature below the melting point of the wax.

The resulting product is a transparent, flexible film having a heat seal bond strength of 50-75 grams and a moisture permeability value of 860.

Example VIII

Purified gel regenerated cellulose film is immersed in an aqueous emulsion treating bath consisting of 5% Asiatic wax, 10% hydrogenated rosin (trade name, Stabelite Resin), 6% partially saponified polyvinyl acetate containing 20% residual polyvinyl acetate and having a saponification number of about 150, 10% glycerol and 1% ammonia. Excess treating emulsion is removed by means of doctor knives and the film dried by passing through a chamber heated to 90° C. The resulting film is clear, shows average heat seal values of 500 grams, and permeability values around 350.

Example IX

The treated film of Example II is coated on both sides with a moistureproofing composition consisting of:

| | Per Cent |
|---|---|
| Nitrocellulose (11.4% N) | 5.64 |
| Dammar (dewaxed) | 0.83 |
| Dibutyl phthalate | 1.53 |
| Dicyclohexyl phthalate | 3.05 |
| Santolite MHP (an aryl sulfonamide formaldehyde resin sold by Monsanto Chem. Co.) | 0.59 |
| Paraffin wax (M. P. 61° C.) | 0.36 |
| Ethyl acetate | 57.20 |
| Ethyl alcohol | 2.64 |
| Toluene | 28.16 | and the film is dried.

The resulting moistureproof, flexible, clear, transparent film has a heat seal bond strength of 680 grams. A base film free of the partially saponified polyvinyl acetate and Uformite 414 but coated with an identical moistureproofing coating exhibits a heat seal bond strength of 65 grams or less than 10% of that of the treated film.

While the present invention is primarily concerned with the treatment of sheets or films of regenerated cellulose and has been described with particular reference thereto, it is not so limited but comprehends as well the treatment in like manner of transparent, smooth, substantially non-porous, non-fibrous, water-sensitive sheets of other cellulosic materials, e. g., lowly substituted cellulose ethers such as glycol cellulose, cellulose glycollic acid, ethyl cellulose, methyl cellulose, etc.

The advantages to be derived from the practice of this invention are self-evident. It is now possible to obtain directly from the casting machine a regenerated cellulose film which is heat sealable and moistureproof. Moreover, the present invention enables the obtainment of greatly improved heat seals from film coated with standard moistureproofing heat sealing coating compositions, and this without slowing up the present rates of film production or in any way complicating the casting and coating equipment. Furthermore, while the heat seal characteristics of the wrapping tissue manufactured in accordance with the principles of my invention are greatly improved, this improvement is not accomplished at the expense of other desirable qualities of the product; the improved wrapping tissue of the instant invention retains all of the desirable qualities heretofore associated with wrapping tissue of this class and is admirably suited for use in packaging a wide variety of materials in automatic packaging machinery.

Since it is obvious that various changes and modifications may be made in the above description without departing from the nature or spirit thereof, this invention is not restricted thereto except as set forth in the appended claims.

I claim:

1. In a process for producing a transparent, flexible film of regenerated cellulose, the improvement which comprises impregnating a purified wet gel regenerated cellulose film with an aqueous composition containing sufficient water-soluble, partially saponified polyvinyl acetate containing 20% polyvinyl acetate and having a saponification number of about 150 to incorporate in the film at least 0.05% by weight, based on the weight of film, of said polyvinyl acetate, and sufficient water-soluble, partially polymerized dimethylol urea resin to effect hardening of the polyvinyl acetate, removing excess composition and drying said film at an elevated temperature whereby to form a flexible, transparent, heat sealable film of regenerated cellulose.

2. In a process for producing a transparent, flexible film of regenerated cellulose, the improvement which comprises impregnating a purified wet gel regenerated cellulose film with an aqueous composition comprising glycerol, a sufficient water-soluble, partially saponified polyvinyl acetate containing 20% polyvinyl acetate and having a saponification number of about 150 to incorporate in the film at least 0.05% by weight, based on the weight of film, of said polyvinyl acetate, from 1% to 10% by weight, based on the weight of aqueous composition, of a high melting paraffin wax, and sufficient water-soluble, partially polymerized dimethylol urea resin to effect hardening of the polyvinyl acetate, removing excess composition and drying said film at an elevated temperature whereby to form a flexible, transparent, moistureproofed, heat sealable film of regenerated cellulose.

3. In a process for producing a transparent, flexible, moistureproof, heat sealable wrapping tissue, the steps which comprise impregnating a purified wet gel regenerated cellulose film with an aqueous composition comprising sufficient water-soluble, partially saponified polyvinyl acetate containing 20% polyvinyl acetate and having a saponification number of about 150 to incorporate in the film at least 0.05% by weight, based on the weight of film, of said polyvinyl acetate, and a water-soluble, sufficient partially polymerized dimethylol urea resin to effect hardening of the polyvinyl acetate, removing excess composition from the film, drying the film at an elevated temperature, and applying to the resulting film a transparent, heat sealable, moistureproof coating.

4. In a process for producing a transparent, flexible, moistureproof, heat sealable wrapping tissue, the steps which comprise impregnating a purified wet gel regenerated cellulose film with an aqueous composition comprising sufficient water-soluble, partially saponified polyvinyl acetate containing 20% polyvinyl acetate and having a saponification number of about 150 to incorporate in the film at least 0.05% by weight, based on the weight of film, of said polyvinyl acetate, and a water-soluble, sufficient partially polymerized dimethylol urea resin to effect hardening of the polyvinyl acetate, removing excess composition from the film, drying the film at an elevated temperature, and applying to the resulting film an intermediate transparent anchoring coating and a transparent, heat sealable, moistureproof top-coating.

5. A heat sealable, moistureproof, transparent wrapping tissue comprising a base film impregnated with glycerol, at least 0.05% by weight, based on the weight of the film, of a water-soluble, partially saponified polyvinyl acetate containing 20% polyvinyl acetate and having a saponification number of about 150, and sufficient dimethylol urea resin to harden the polyvinyl acetate, and coated with a heat sealable, moistureproofing coating for regenerated cellulose.

6. A heat sealable, moistureproof, transparent wrapping tissue comprising a base film impregnated with glycerol, at least 0.05% by weight, based on the weight of the film of a water-soluble, partially saponified polyvinyl acetate containing 20% polyvinyl acetate and having a saponification number of about 150, and sufficient dimethylol urea resin to harden the polyvinyl acetate, and coated with an intermediate anchoring coating, and a moistureproofing, heat sealable top-coating for regenerated cellulose.

7. The process of rendering transparent regenerated cellulose film heat sealable which comprises incorporating in a regenerated cellulose film at least 0.05% by weight, based on the weight of film, of a water-soluble polyvinyl alcohol having a hydroxyl content from 70% to 96% of the theoretical maximum and containing a group from the class consisting of ester, ether, acetal and ketal groups, and sufficient water-soluble thermosetting resin from the group consisting of phenol-aldehyde, urea-aldehyde and amine-aldehyde resins to effect hardening of the polyvinyl alcohol, and heating said film to convert said resin to the insoluble state.

8. The process of rendering transparent regenerated cellulose film heat sealable which comprises impregnating wet gel regenerated cellulose film with an aqueous solution containing sufficient water-soluble polyvinyl alcohol having a hydroxyl content from 70% to 96% of the theoretical maximum and containing a group from the class consisting of ester, ether, acetal and ketal groups, to incorporate in the film at least 0.05% by weight, based on the weight of film, of said polyvinyl alcohol, and sufficient water-soluble thermosetting resin from the group consisting of phenol-aldehyde, urea-aldehyde and amine-aldehyde resins to effect hardening of the polyvinyl alcohol, removing excess solution from the film and thereafter drying said film at an elevated temperature.

9. In a process for producing a transparent, flexible film of regenerated cellulose, the improvement which comprises impregnating a purified wet gel regenerated cellulose film with an aqueous composition containing sufficient water-soluble polyvinyl alcohol having a hydroxyl content from 70% to 96% of the theoretical maximum and containing a group from the class consisting of ester, ether, acetal and ketal groups, to incorporate in the film at least 0.05% by weight, based on the weight of film, of said polyvinyl alcohol, sufficient of a water-soluble thermosetting resin from the group consisting of phenol-aldehyde, urea-aldehyde, and amine-aldehyde resins to effect hardening of the polyvinyl alcohol, and from 1% to 10% by weight, based on the weight of aqueous composition, of a moistureproofing wax, removing excess composition and drying said film at an elevated temperature whereby to form a flexible, transparent, moistureproofed, heat sealable film of regenerated cellulose.

10. A heat sealable, transparent wrapping tissue comprising a transparent, flexible regenerated cellulose film impregnated with at least 0.05% by weight, based on the weight of film of a water-soluble, partially saponified polyvinyl acetate containing 20% polyvinyl acetate and having a saponification number of about 150 and sufficient insoluble synthetic resin from the group consisting of phenol-aldehyde, urea-aldehyde and amine-aldehyde resins to harden the saponified polyvinyl acetate.

WILLIAM A. HOFFMAN.

REFERENCES CITED

The following references are of record in the file of this patent:

UNITED STATES PATENTS

| Number | Name | Date |
|---|---|---|
| 2,130,212 | Watkins | Sept. 13, 1938 |
| 2,147,180 | Ubben | Feb. 14, 1939 |
| 2,147,628 | Charch | Feb. 21, 1939 |
| 2,159,007 | Charch et al. | May 23, 1939 |
| 2,169,250 | Izard | Aug. 15, 1939 |
| 2,322,888 | Schwartz | June 29, 1943 |
| 2,328,057 | Coulter | Aug. 31, 1943 |
| 2,362,580 | Nadeau | Nov. 14, 1944 |
| 2,394,009 | Pollard | Feb. 5, 1946 |
| 2,406,905 | Rothrock | Sept. 3, 1946 |

FOREIGN PATENTS

| Number | Country | Date |
|---|---|---|
| 542,964 | Great Britain | Feb. 4, 1942 |